United States Patent [19]

Haga

[11] 4,059,746
[45] Nov. 22, 1977

[54] PULSE DISTRIBUTION APPARATUS FOR LINEAR INTERPOLATION IN A NUMERICAL CONTROL SYSTEM

[75] Inventor: Kyosuke Haga, Anjo, Japan
[73] Assignee: Toyoda-Koki Kabushiki-Kaisha, Japan
[21] Appl. No.: 755,140
[22] Filed: Dec. 29, 1976
[30] Foreign Application Priority Data
 Feb. 25, 1976  Japan .................................. 51-20338
[51] Int. Cl.² ............................................ G05B 19/28
[52] U.S. Cl. .................................... 364/107; 318/603; 318/696; 318/573; 364/723
[58] Field of Search .............................. 318/573, 603; 235/151.11

[56] References Cited
U.S. PATENT DOCUMENTS
3,576,981  5/1971  Okamoto et al. ................. 318/573 X Primary Examiner—Eugene G. Botz
Attorney, Agent, or Firm—Oblon, Fisher, Spivak, McClelland & Maier

[57] ABSTRACT

An apparatus for distributing drive pulses to drive servomechanisms in a numerical control system is provided with a clock pulse generator, presettable counters respectively associated with the servomechanisms, and a digital computer. Each counter generates an output command each time it receives from the pulse generator clock pulses of the same number as its preset value. The digital computer is programmed to calculate from numerical control data pulse distribution cycles for the respective servomechanisms, and is further programmed to distribute one drive pulse to the corresponding servomechanism, as well as supplying the period of the distribution cycle for the same servomechanism as a preset value to the counter when the output command is supplied from the same.

7 Claims, 5 Drawing Figures

PULSE DISTRIBUTION APPARATUS FOR LINEAR INTERPOLATION IN A NUMERICAL CONTROL SYSTEM

BACKGROUND OF THE INVENTION

1. Field of the Invention

The present invention relates generally to a numerical control system for machines, and more particularly to a pulse distribution apparatus for distributing drive pulses to drive servomechanisms in such a system so as to displace thereby a movable member along a line segment to be linearly interpolated.

2. Description of the Prior Art

In one known pulse distribution method for linear interpolation, there is first made a decision as to whether a transient position of a movable member which is displaced along both X and Y-coordinate axes is present within the plus (+) area or the minus (−) area with respect to a line segment to be linearly interpolated and then, one drive pulse whose frequency is controlled in accordance with a commanded feed rate is distributed to either of the X and Y-axis directions depending upon the result of the decision. Therefore, it is necessary to carry out one operation each time one pulse is outputted, and the locus approximated by the method becomes stepped, undesirably inviting large error as well as lacking smoothness. Moreover, as the frequency of the drive pulse is controlled faithfully in agreement with the feed rate, the resultant feed rate undesirably fluctuates depending upon the slope of the line segment to be interpolated.

SUMMARY OF THE INVENTION

It is therefore an object of the present invention to provide an improved pulse distribution apparatus capable of exactly maintaining at a commanded value the resultant feed rate of a movable member moved along orthogonal coordinate axes.

Another object of the invention is to provide an improved pulse distribution apparatus as above by which smooth linear interpolation is attained.

A further object of the invention is to provide an improved pulse distribution apparatus as above wherein the load to a digital computer provided as an essential system component can be remarkably reduced.

Briefly, according to the invention, there is provided a pulse distribution apparatus for distributing drive pulses to drive servomechanisms in a numerical control system, which apparatus comprises a clock pulse generator for generating clock pulses in a predetermined frequency, at least two presettable counter means respectively associated with the servomechanisms and each adapted to generate an output command each time when receiving through gate means clock pulses of the same number as its preset value, the gate means being closed in response to the output command, and a digital computer connected with the counter means and the servomechanisms.

The computer is programmed to calculate, from numerical control data, periods of pulse distribution cycles for the respective servomechanisms at which drive pulses are distributed to make the resultant feed rate of a movable member agree perfectly with a commanded feed rate. The computer is further programmed to distribute one drive pulse to one of the servomechanisms as well as to supply the value of the period of the distribution cycle for the same servomechanism as the preset value to the corresponding counter means when the output command is supplied from the same.

Accordingly, the resultant feed rate of the movable member can be maintained at the commanded feed rate irrespective of change in slope of a line segment to be interpolated. Furthermore, as the computer is relieved of operation for linear interpolation during the time the counter means are in operation, it becomes possible for the computer to deal with other jobs during such time. In addition, the distribution cycle for each servomechanism is maintained fixed throughout the whole distribution steps, so that smooth linear interpolation can be achieved.

BRIEF DESCRIPTION OF THE DRAWINGS

Various other objects and features and attendant advantages of the invention will readily be appreciated as the same becomes better understood from the following detailed description of preferred embodiments when considered in connection with the accompanying drawings, in which.

DETAILED DESCRIPTION OF PREFERRED EMBODIMENTS

Figure 1:
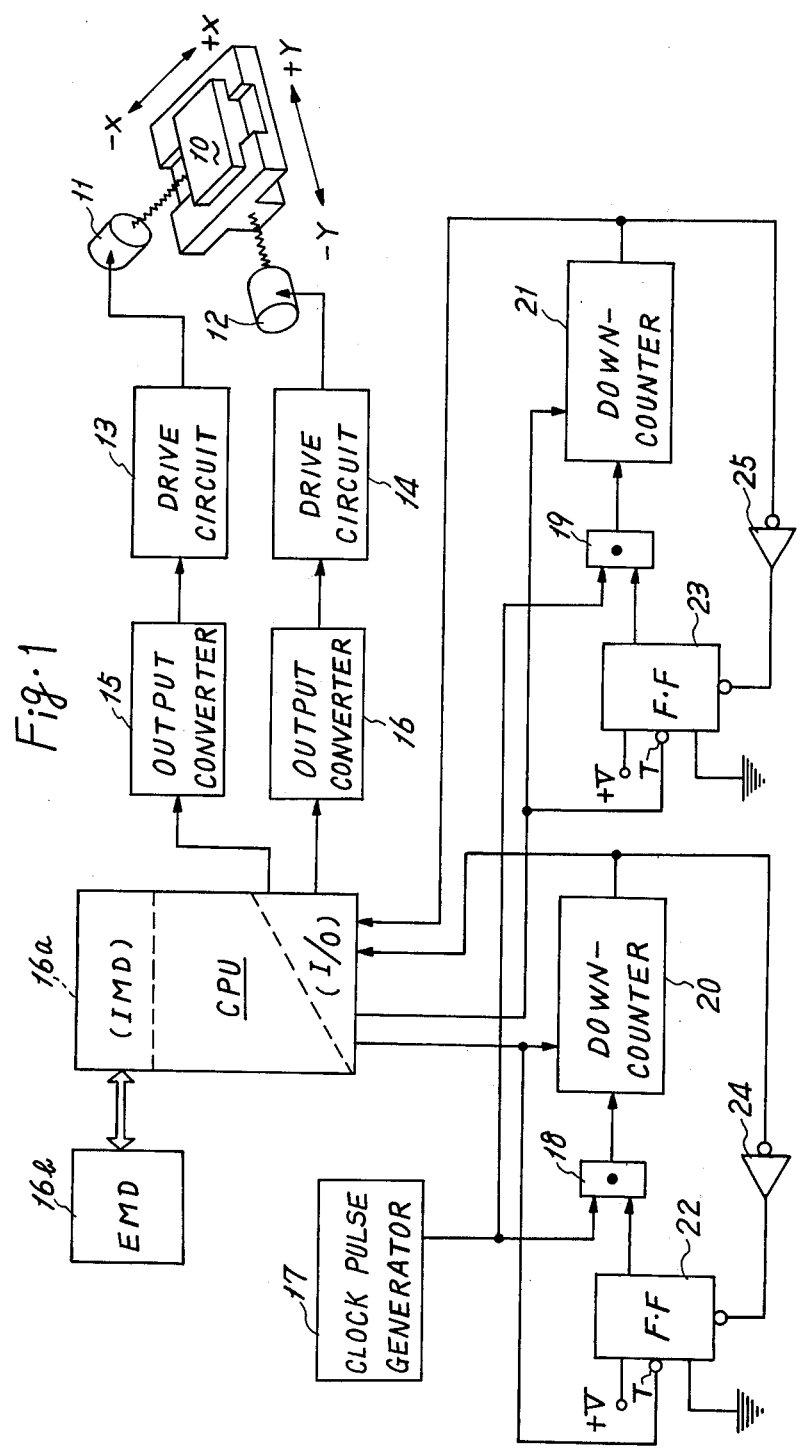
FIG. 1 shows a block diagram of a pulse distribution apparatus constructed according to the invention.
Figure 2A:
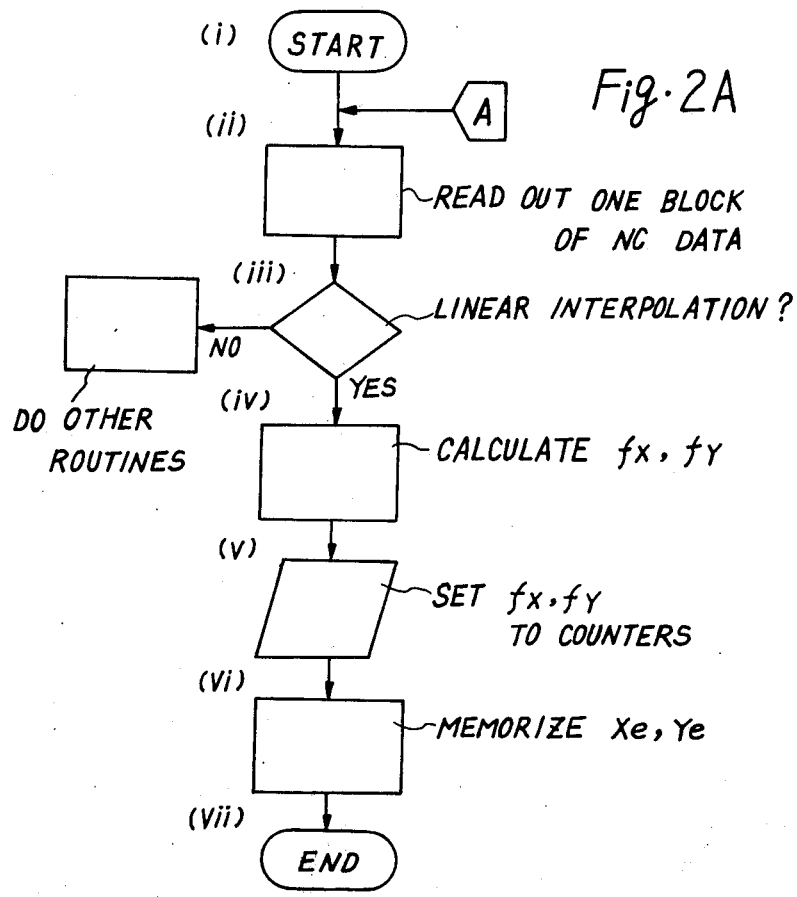
FIGS. 2A and 2B shows a flow chart of a pulse distribution program stored within the central processing unit of FIG. 1.
Figure 2B:
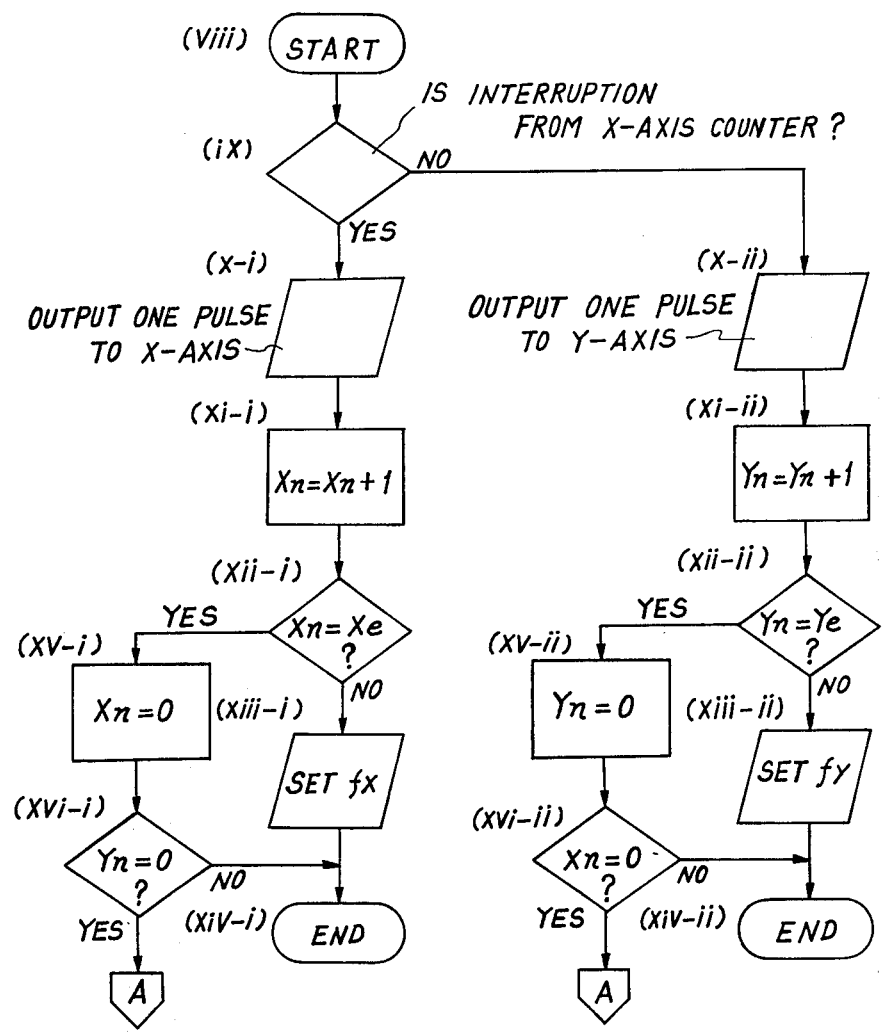

Referring now to the drawings, wherein like reference numerals designate like or corresponding parts throughout the several views, and more particularly to FIG. 1 thereof, reference numerals 11 and 12 designate pulse-responsive stepping motors for displacing a movable member 10 in both the X and the Y-axis directions of an X-Y orthogonal coordinate system. The motors 11, 12 are connected with a central processing unit CPU of a digital computer of small capacity through respective drive circuits 13 and 14 and respective output converter circuits 15 and 16 so as to constitute drive servomechanisms for the respective axes. Reference numeral 17 designates a clock pulse generator, which generates one clock pulse every 1 μ sec. (a basic time) to provide clock pulses at a frequency of 1,000 kHz. The clock pluses are supplied through AND gates 18 and 19 to presettable downcounters 20 and 21 respectively associated with the servomechanisms. Downcounters 20, 21 are respectively presettable in accordance with pulse distribution cycles for the X and Y-axes calculated by the central processing unit CPU and are each arranged to generate an output command from its null terminal each time its preset content is subtracted to zero by the clock pulses. Reference numerals 22 and 23 denote J-K flip-flops, the output terminals of which are connected to the AND gates 18, 19, the clock terminals T of which are connected to output terminals of the central processing unit CPU, and the reset terminals of which are connected to the null terminals of the down-counters 20, 21 through inverters 24 and 25, respectively. The central processing unit CPU is provided therein with a core memory 16a as an internal memory device IMD and has a magnetic disc 16b as an external memory device EMD connected thereto. Within the core memory 16a there is assigned a first memory area for storing coordinate values $X_e$, $Y_e$ of a terminal, or end, point of a line segment to be interpolated and a second memory area for storing the cooridinate values $X_n$, $Y_n$ of a current, or transient, point which lies on the path to the end point. Within the core memory 16a, there is stored a linear interpolation program as shown in FIGS. 2A and 2B, enabling the central processing unit CPU to perform data processing operations as follows: Firstly, there is calculated from numerical control data the time T which is required for the movable member 10 to travel at a specified feed rate F the entire length L of a line segment to be interpolated. To be more exact, the required time T is calculated by dividing the length L of the line segment by the feed rate F. Then, the required time T is divided by the respective numbers $N_x$ and $N_y$ of pulses to be distributed to the X and Y-axes so as to calculate the periods of the pulse distribution cycles, $f_x$ and $f_y$, for the axes. The numbers $N_x$, $N_y$ are proportional to the coordinate values $X_e$, $Y_e$ of the above-noted end point, so that all the pulses to be distributed to any one of the axes can be assigned within the required time T when distributed at the cycle period $f_x$ or $f_y$ corresponding thereto. Next the values of the periods of the distribution cycles $f_x$, $f_y$ are supplied to the down-counters 20, 21 for the X and Y-axes. Upon receiving the output command from any one of the counters 20, 21, the processing unit CPU supplies one drive pulse to the axis associated with the counter 20 or 21 which is generating the output command, and supplies to the counter 20 or 21 the value of the period of the distribution cycle $f_x$ or $f_y$ therefor, and further repeats the last mentioned step until a condition $X_n = X_e$ and $Y_n = Y_e$ is obtained.

Figure 3:
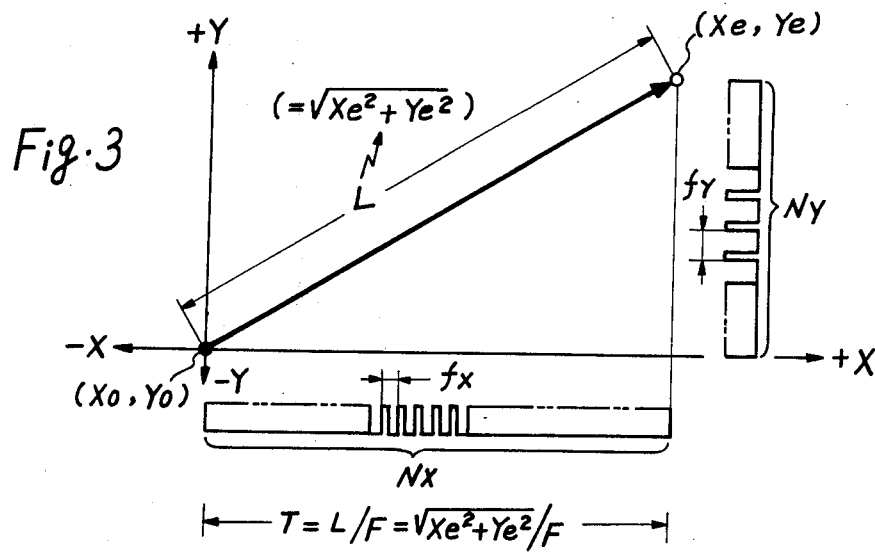
FIG. 3 is a graphical representation explaining linear interpolation achieved by the invention.

The operation of the embodiment constructed as above will be described in accordance with the interpolation program shown in FIGS. 2A and 2B hereinunder. When a start button (not shown) is pushed, the central processing unit CPU executes program step (ii) to (vi) in order. That is, the processing unit CPU first reads out one block of numerical control (NC) data stored in the magnetic disc 16b for transfer to the core memory 16a and then, decides in step (iii) whether or not the NC data is linear interpolation data. Assuming now that it is instructed in the NC data to carry out a linear interpolation from the origin $X_o$, $Y_o$ to the end point of coordinates $X_e$, $Y_e$, as viewed in FIG. 3, at a feed rate F, the processing unit CPU in step (iv) then calculates the length $L = \sqrt{X_e^2 + Y_e^2}$ of a line segment to be interpolated, and divides the length L by the feed rate F so as to obtain the required time $T = L/F = \sqrt{X_e^2 + Y_e^2} F$. Still in step (iv), the processing unit CPU further divides the required time T by the numbers $N_x$ and $N_y$ of pules to be distributed respectively to the X and Y-axes so as to calculate the values of the periods of the pulse distribution cycles $f_x = T/N_x$ and $f_y = T/N_y$ for the respective ax.s, and the values $f_x$, $f_y$ are stored in respective output registers (not shown) provided within the processing unit CPU until new data are stored in their place. It is noted that the periods of the distribution cycles $f_x$, $f_y$ are selected of the order of $\mu$secs., so as to be reduced to integral multiples of the period of the clock pulse generator 17. It is also noted that if the movable member 10 is designed to move 1 $\mu$(0.001 mm) for each drive pulse, the pulse numbers $N_x$, $N_y$ become equal to the coordinate values $X_e$, $Y_e$ of the end point, respectively. In the following step (v), the processing unit CPU issues programmed instructions, in response to which the values of the periods of the pulse distribution cycles $f_x$, $f_y$ stored in the output registers are transferred and supplied respectively to the down-counters 20, 21. Furthermore, the programmed instructions are supplied respectively to the clock terminals T of the flip-flops 22, 23, which thus send out outputs "1" from their respective set output terminals. Accordingly, the clock pulses from the pulse generator 17 are input through the AND gates 18, 19 to the subtraction input terminals of the down-counters 20, 21, whereby the content of each of the counters 20, 21 is decreased by one each time one clock pulse is supplied to the counter 20 or 21. Thereafter, the processing unit CPU writes the coordinate values $X_e$, $Y_e$ of the end point within the first memory area of the memory 16a in step (vi), and waits until an interrupt command is applied thereto. When the pulse distribution cycle, in this instance, for the X-axis, comes to an end, the content of the down-counter 20 is zero and it generates the output command from its null terminal, so that the interrupt command is applied to the processing unit CPU. At the same time, the flip-flop 22 is reset to inhibit transmitting the clock pulses to the down-counter 20. Upon receipt of the interrupt, the processing unit CPU executes step (ix) to decide whether or not the down-counter whose content has become zero is one for the X-axis, and as it is confirmed that the counter is one for the X-axis, there is executed step (x-i) in which one drive pulse is supplied to the output converter circuit 15 of the X-axis. The stepping motor 11 is operated in response to the one pulse, whereby the movable member 10 is displaced one unit, for example 1$\mu$, in the X-axis direction. In the following step (xi-i), the transient point value stored within the second memory area of the memory 16a is increased by one, and a decision is made in step (xii-i) as to whether or not the new coordinate value $X_n$ of the transient point is equal to the X-axis coordinate value $X_e$ of the end point. If "NO" is the result, the period of the distribution cycle $f_x$ stored in the output register is again supplied to the down-counter 20 for the X-axis and the flip-flop 22 is also set. As a result, the clock pulses are input to the down-counter 20 and, the processing unit CPU waits until receiving the next interrupt command. When the pulse distribution cycle for the Y-axis comes to an end, following step (ix) steps (x-ii) to (xiii-ii) are executed in order, whereby, in the same manner as described in connection with the X-axis, the stepping motor 12 is operated in response to one pulse to thereby displace the movable member 10 one unit (1$\mu$) in the Y-axis direction. The program steps (viii) to (xiv-i,ii) are repeated, and when the coordinate values $X_n$, $Y_n$ of the transient point coincide respectively with those values $X_e$, $Y_e$ of the end point, this linear interpolation is completed, so that the processing unit CPU operates to read out new NC data.

Figure 4:
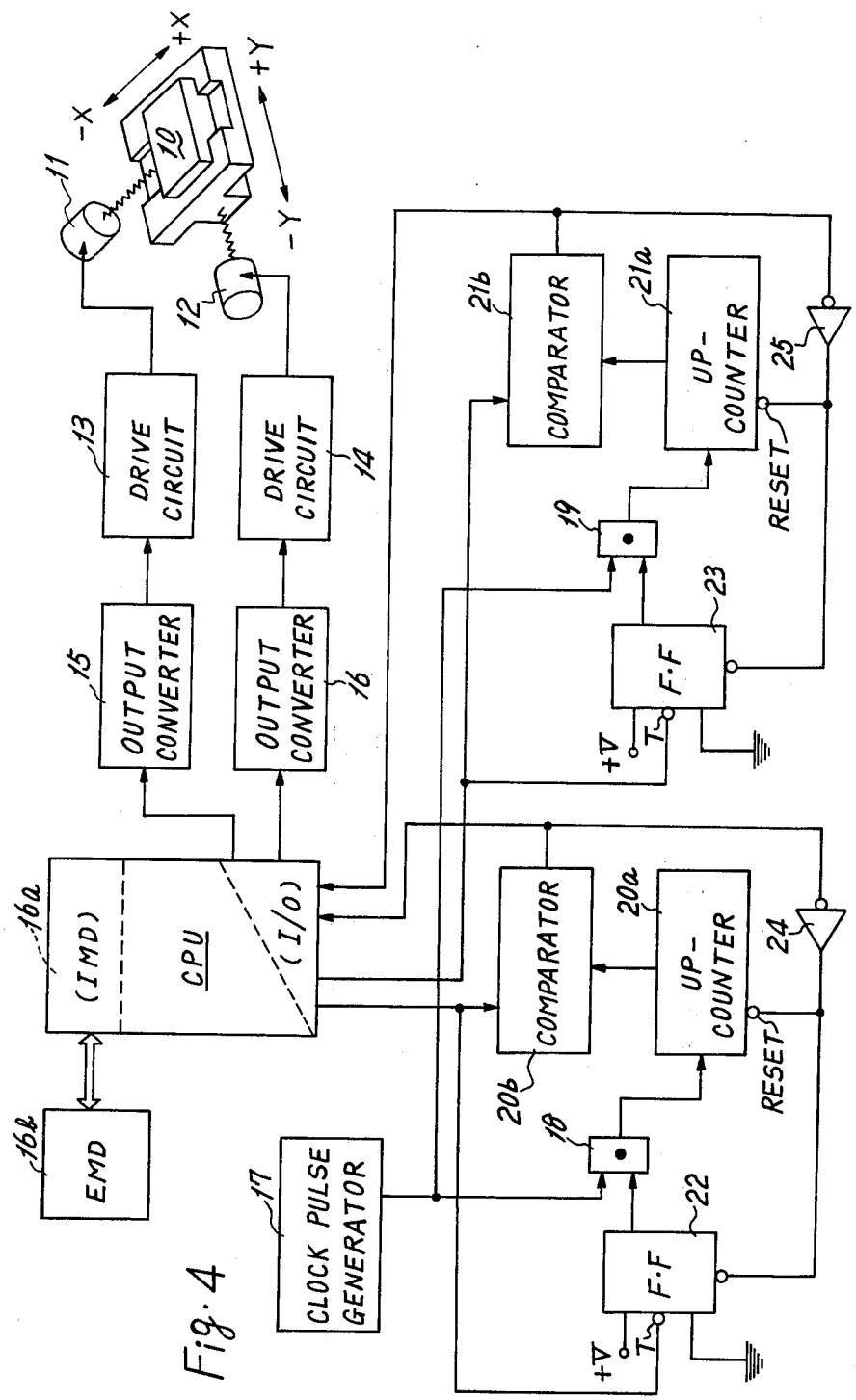
FIG. 4 shows a block diagram of a pulse distribution apparatus used in place of that of FIG. 1.

FIG. 4 illustrates another preferred embodiment of the invention, wherein up-counters 20a, 21a and comparators 20b, 21b are utilized in place of the down-counters 20, 21 of the first embodiment. The up-counters 20a, 21a are connected at additional input terminals thereof with AND gates 18, 19 to receive therefrom clock pulses, respectively, and the comparators 20b, 21b are arranged to be presettable with the periods of the pulse distribution cycles $f_x$, $f_y$ from the processing unit CPU and to generate output commands when the contents of the counters 20a, 21a coincide with the values of the periods of the cycles $f_x$, $f_y$, respectively. The output command from any one of the comparators 20b, 21b is applied to the processing unit CPU to instruct the same to distribute one drive pulse to the corresponding axis and also to the associated up-counter so as thereby to reset the same.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pulse distribution apparatus for distributing drive pulses to drive a plurality of servomechanisms in a numerical control system to thereby displace a movable member along a line segment to be linearly interpolated, comprising:
   a digital computer connected with said servomechanisms;
   a clock pulse generator for generating clock pulses at a predetermined frequency;
   a plurality of presettable counter means each respectively associated with one of said plurality of servomechanisms and each connected to said digital computer to receive a preset value therefrom and to said clock pulse generator to receive said clock pulses for generating an output command to said digital computer when receiving said clock pulses corresponding in number to said preset value therein; and
   gate means respectively connected between said counter means and said clock pulse generator for inhibiting the transmitting of said clock pulses to the corresponding counter means when the same generates said output command;
   said digital computer including:
   means for calculating from numerical control data the time which is required for said movable member to travel over the entire length of said line segment at a commanded feed rate,
   means for calculating periods for pulse distribution cycles for said respective servomechanisms, each of said cycles being determined to assign within said required time all of pulses to be distributed to one of said axes relating thereto, and
   means for distributing one drive pulse to one of said servomechanisms and for supplying the value of the period of one of said distribution cycles for said one servomechanisms as said preset value to one of said counter means each time the same generates said output command.

2. An apparatus as claimed in claim 1, wherein said time calculating means comprises means for dividing the length of said line segment by said commanded feed rate.

3. An apparatus as claimed in claim 2, wherein said periods calculating means comprises means for dividing said required time by the respective numbers of pulses to be distributed to said servomechanisms.

4. An apparatus as claimed in claim 3, wherein each of said counter means comprises a presettable down-counter for decreasing by one said preset value preset by said computer each time one pulse is supplied thereto from said corresponding gate means and for generating said output command when said preset value is reduced to zero.

5. An apparatus as claimed in claim 4, wherein each of said gate means comprises:
   a gate circuit connected between said clock pulse generator and one of said down-counters associated therewith, and
   flip-flop circuit means for opening said gate circuit when set upon receipt of a set signal from said digital computer and for closing said gate circuit when reset upon receipt of said output command from said one of down-counters.

6. An apparatus as claimed in claim 3, wherein each of said counter means comprises:
   a presettable up-counter for counting said clock pulses supplied from said corresponding gate means, and
   a comparator connected to said presettable up-counter for generating said output command when the content of said up-counter coincides with said preset value input thereto from said digital computer, said up-counter being responsive to said output command to be reset thereby.

7. An apparatus as claimed in claim 6, wherein each of said gate means comprises:
   a gate circuit connected between said pulse generator and one of said up-counters associated therewith, and
   flip-flop circuit means for opening said gate circuit when set upon receipt of a set signal from said digital computer and for closing said gate circuit when reset upon receipt of said output command from said one of up-counters.

* * * * *